July 7, 1964 A. J. DEERFIELD 3,140,470

ERROR CHECKING CIRCUIT FOR A PLURALITY OF PARALLEL DATA TRANSMISSION CHANNELS

Filed Aug. 4, 1958 6 Sheets-Sheet 1

INVENTOR.
ALAN J. DEERFIELD
BY Henry L. Hanson
ATTORNEY

July 7, 1964 A. J. DEERFIELD 3,140,470

ERROR CHECKING CIRCUIT FOR A PLURALITY OF PARALLEL DATA TRANSMISSION CHANNELS

Filed Aug. 4, 1958 6 Sheets-Sheet 2

INVENTOR.
ALAN J. DEERFIELD
BY Henry L. Hanson
ATTORNEY

INVENTOR.
ALAN J. DEERFIELD
BY Henry L. Hanson
ATTORNEY

July 7, 1964 A. J. DEERFIELD 3,140,470

ERROR CHECKING CIRCUIT FOR A PLURALITY OF PARALLEL DATA TRANSMISSION CHANNELS

Filed Aug. 4, 1958 6 Sheets-Sheet 4

INVENTOR.
ALAN J. DEERFIELD
BY Henry L. Hanson
ATTORNEY

INVENTOR.
ALAN J. DEERFIELD
BY Henry L. Hanson
ATTORNEY

July 7, 1964 A. J. DEERFIELD 3,140,470

ERROR CHECKING CIRCUIT FOR A PLURALITY OF PARALLEL DATA TRANSMISSION CHANNELS

Filed Aug. 4, 1958 6 Sheets-Sheet 6

INVENTOR.
ALAN J. DEERFIELD
BY Henry L. Hanson
ATTORNEY

United States Patent Office 3,140,470

Patented July 7, 1964

3,140,470

ERROR CHECKING CIRCUIT FOR A PLURALITY OF PARALLEL DATA TRANSMISSION CHANNELS

Alan J. Deerfield, Franklin, Mass., assignor to Minneapolis-Honeywell Regulator Company, Minneapolis, Minn., a corporation of Delaware Filed Aug. 4, 1958, Ser. No. 752,857
15 Claims. (Cl. 340—172.5)

A general object of the present invention is to provide a new and improved apparatus useful in connection with the checking of the operation of a plurality of electrical circuits. More specifically, the present invention is concerned with a new and improved apparatus for checking the operation of a data processing circuit which is characterized by its providing an electrical check of all elements of a signal transmission circuit regardless of whether selected ones of the elements of the transmission circuit are utilized in any specific transmission of data.

Data processing circuits are utilized in many different ways for the transfer, storage, or manipulation of digital data. Normally, these data processing circuits are very reliable and will perform very satisfactorily without human intervention over long periods of time. However, data processing circuits are subject to failure and even a very minute or limited failure in a very restricted area of an overall data processing system may cause a catastrophic result in an overall data processing problem if the presence of an error is not recognized at the instant that it occurs.

One particular area where the principles of the present invention find utility is in connection with circuitry used for supplying the driving signals for a high speed printer. Such a printer might be, for example, a printer operating at the rate of approximately 900 lines per minute where each line encompasses a plurality of alphabetic or numeric characters. In the case of a printer using a rotating drum having a plurality of rows of characters formed along the surface of the drum with each row containing all the symbols and characters in a straight line around the periphery thereof, it is customary to use timed hammers to effect a movement of a suitable inking ribbon and a paper against the print wheel to produce the desired character on the paper. The signals for driving the hammers associated with the print wheel are derived from suitable electronic circuitry which is capable of making a comparison of a character to be printed and a signal representative of a particular character which may be under the hammer at a particular instant. The comparison circuitry produces an appropriate electrical signal which in turn is used to trigger an appropriate output circuit. This output circuit supplies the energy for activating the hammer to accomplish the desired printing. It is important in such an apparatus that a check be made to see that once a predetermined comparison has been made indicating a certain character should be printed, that the signal was in fact applied to the hammer associated with that character. Further, it is also desired that in the unused circuits, where there may not have been a character comparison, they be checked as to their ability to accept or reject a comparison signal. Thus, in the event that the circuit is not capable of accepting a comparison signal, an alarm or indicator will be actuated. This checking is accomplished by unique circuits which effect a desired sequencing of all of the coupling circuits associated with the printer to the end that for each character to be printed, all of the sequencing circuits are checked insofar as operability is concerned.

It is accordingly a further more specific object of the present invention to provide a new and improved checking apparatus for a plurality of signal transfer circuits whereby the operability of the signal transfer circuits are all checked whether or not the circuits may have been used in a signal transfer operation.

A still further more specific object of the present invention is to provide a new and improved checking apparatus for a plurality of signal transfer circuits which are normally operating in parallel for signal transfer purposes and are in turn operating in series for signal checking purposes.

Another more specific object of the present invention is to provide a new and improved checking apparatus for a plurality of checking circuits, each of which are adapted to operate independently of each other for signal transfer purposes, and each includes a bistable circuit element in combination with means for causing the bistable circuit element to be switched from one bistable state to the other in accordance with a signal transfer and checking operation regardless of whether or not a specific bistable circuit element may have been activated for a selected signal transfer.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
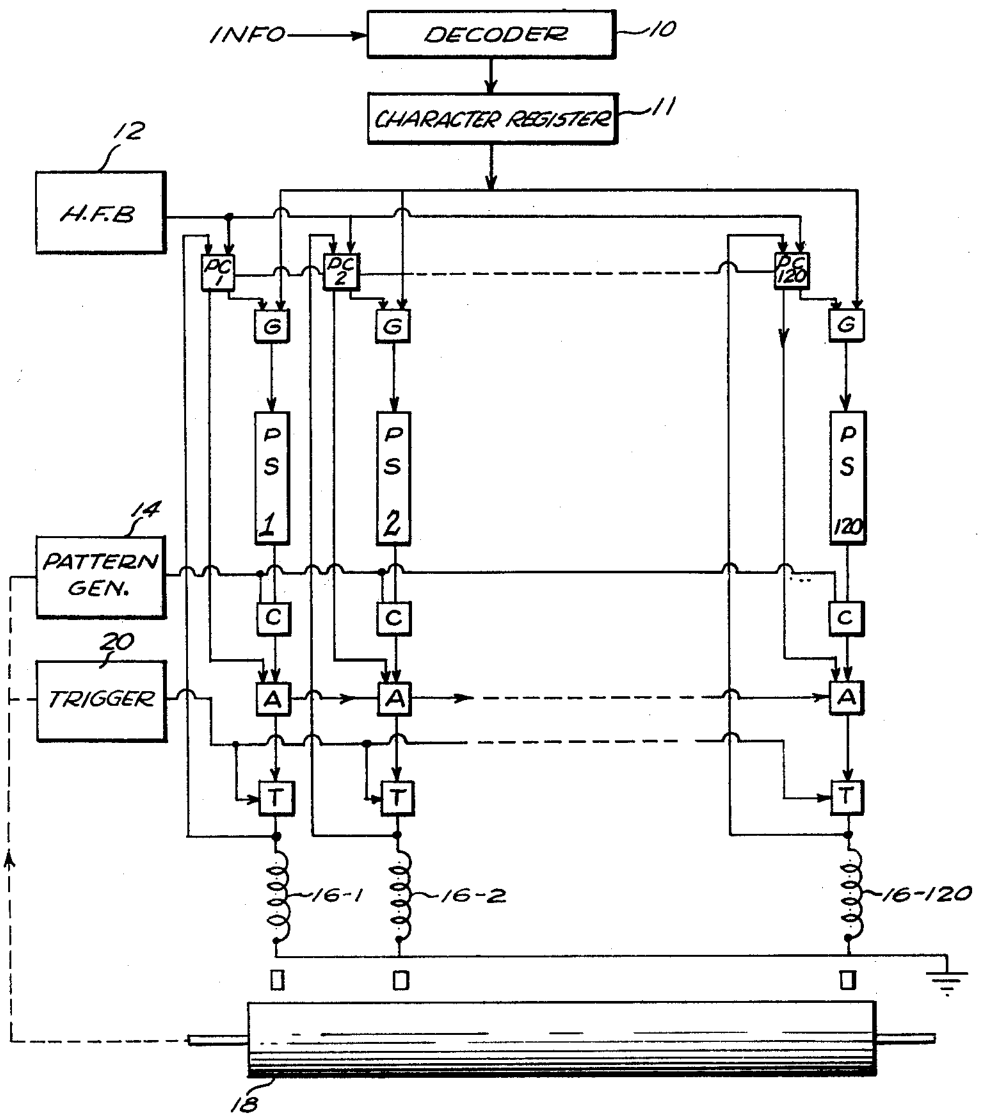
FIGURE 1 is a diagrammatic representation of a printer which may incorporate the principles of the present invention.

Referring first to FIGURE 1, the numeral 10 represents a suitable decoder circuit which accepts information from an input signal source and provides on the output thereof a code for a particular character representative of the information bits applied to the decoder 10. The character will then be stored in a character register 11 which may be of any suitable well known type. It is here assumed that the character register 11 is a six bit register.

The character which has been inserted in the character register 11 will be appropriately gated into one of the print storage circuits PS1–120 depending upon the selection signals which may be applied to the print control circuits PC1–PC120. The print control circuits PC1–PC120 function as gating and signal producing circuits with the particular circuits selected for any one particular character entry into print storage being controlled by signals derived from a horizontal format board 12, the latter being a manual plugboard by which it is possible to selectively plug the characters coming from the register 11 into selected print storage PS locations.

The output of the print storage registers PS1–PS120 are each applied to associated comparison circuits C, these comparison circuits having applied to a further input thereof suitable patterns representing the characters on the print wheel or drum 18 by way of the pattern generator 14.

The outputs of the respective comparison circuits C are applied to associated activity signal transfer circuits A, one each being associated with the respective comparison circuits. The activity circuits A also receive inputs from the print control circuits PC1–PC120 respectively. The signals from the print control circuits function in a manner to be hereinafter more fully described to feedback a signal for controlling the setting of the activity circuits A.

The outputs of the activity circuits A are connected to suitable thyratrons T, the latter being connected in controlling relation to suitable solenoids 16–1 through 16–120, respectively. These thyratrons and solenoids are used to operate suitable hammers associated with a suitable print wheel or drum 18 which has a plurality of rows of characters embossed on the surface thereof. The timing of the firing of the thyratrons T and the associated output devices is controlled by a trigger circuit 20 which is appropriately synchronized with the operation of the print wheel 18. A suitable printing mechanism and triggering mechanism may be of the type illustrated in the Rosen et al. Patent 2,805,620, issued September 10, 1957.

The operation of the circuit of FIGURE 1, independently of the checking features thereof, may be understood by tracing a representative character to the print wheel 18. When the decoder 10 has an output character dropped into the character register 11, the character is then applied to the gating circuits G. The particular gating circuit which is activated to pass the character will be dependent upon which of the print control circuits PC1–PC120 is active at the particular instant that the character from the register 11 is received. Thus, if the horizontal format board 12 is arranged to supply a start signal to the print control circuit PC1, PC1 will in turn supply a gating signal to the gate G connected to the output thereof. Thus, the character register 11 will pass its output through the gate G into the print storage circuit PS1.

For each batch of information, sometimes referred to as a blockette of information, a particular line of print will be set up in the print storage registers PS1–PS120. Once the particular blockette of information has been processed through the decoder and dropped into the print storage registers, if the number of possible characters on the print roll 18 is 56, it is necessary that the print hammer associated with any particular character stored in storage PS be moved adjacent the print wheel 18 in synchronism with the time that the particular character is under the hammer so that an appropriate transfer may be made between an inked ribbon and paper, not shown. In order to determine when a particular character is in position on the print wheel 18, with respect to the hammer, there is a comparison made between the pattern generator 14 whose output takes the form of a series of bits corresponding to the bits stored in the print storage circuits. If there is an identity between the bits in the print storage PS1 and the output from the pattern generator, the comparison circuit C will provide a certain control action with respect to the activity circuit A. The activity circuit A will in turn supply an appropriate control signal to the thyratron T, the latter of which will be triggered by a trigger source 20, the latter also being synchronized with the operation of the print wheel 18. When the thyratron T fires, the appropriate solenoid 16 will act on the hammer and the hammer will move adjacent the print roll so as to effectively strike the character corresponding to the character in print storage. This operation will take place for all of the 56 characters on the print roll 18 in the order in which the characters appear upon the print roll so that at the end of one revolution, all of the characters which may have been in print storage will have been printed in a line on any paper associated with the printer.

After one particular line has been printed, a new blockette of information will be decoded and dropped into print storage and the apparatus will continue to operate and set up a new line of print which will then read out to the printer in the manner above described.

In the operation described thus far, no mention has been made of the checking circuits related to this signal transfer circuitry. One of the areas where it is desirable to check circuit operation is in the area of the activity circuits A and the thyratron circuits T. Thus, when a particular activity circuit has been activated in a predetermined manner, it is desirable to know that this circuit is capable of being switched even though the switching might not have occurred due to the presence of a predetermined character. Similarly, it is desired to know that when a particular thyratron was supposed to fire that it in fact did fire. For this checking function to be accomplished, the output signal from any thyratron which has been fired is reflected back through the print control circuit PC associated with the particular print storage circuit and in turn acts upon the activity circuit to switch its electrical state to a predetermined state. The electrical state of each of the activity circuits A is then sequentially switched from one circuit to the next until all of the circuits have switched to the same state. If the circuits are all switched to the same state, proper operation is indicated and the apparatus will function to print the next character which may be stored in print storage.

A more complete understanding of the checking circuits will be discussed below following a more detailed discussion of the individual circuits associated with the print control and print storage circuits.

Figure 2:
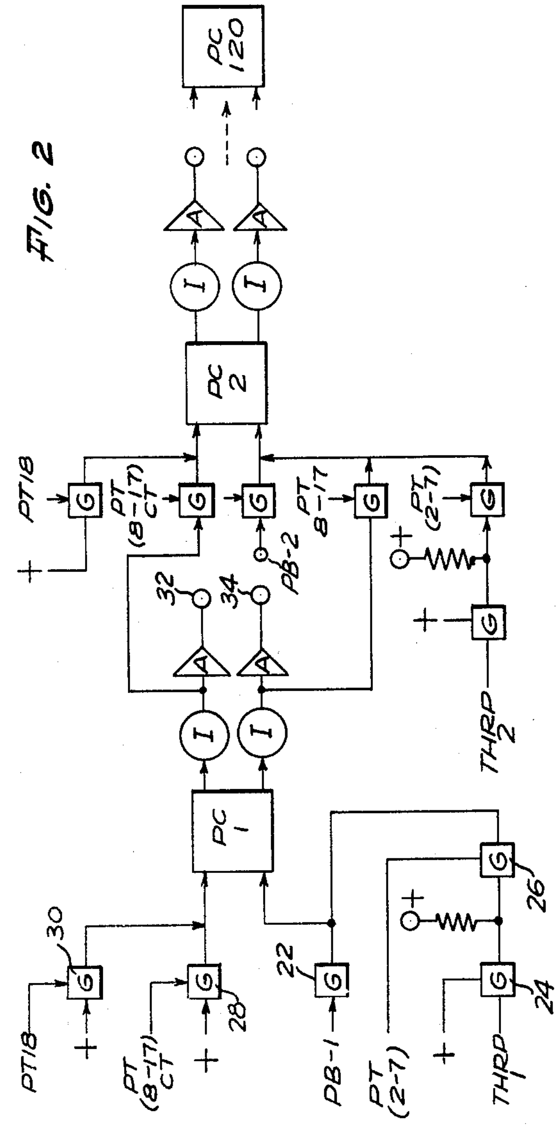
FIGURE 2 is a diagrammatic representation of the print control circuitry associated with the checking circuitry of the present invention.

Referring to FIGURE 2, there is here illustrated the print control circuits PC1 and PC2 complete with the appropriate input control gating circuits therefor. Each of the print control circuits PC1 and PC2 may be considered as bistable flip-flops which are effective, when a negative voltage is applied to the upper input terminal, to switch to the reset state and when in the reset state, the upper output terminal will be low in potential. Conversely, if a negative set signal is applied to the lower input terminal, the flip-flop will switch so that the lower output terminal will be in the set state or low in potential.

In order to set a particular print control circuit, for example PC1, a plugboard signal PB is applied to a gate 22, the latter of which will apply an input to the set side of the print control flip-flop PC1. The circuit PC1 is also adapted to be set by a combination of a thyratron return pulse signal THRP1 acting through a gate 24 and a further gate 26, the latter of which has a timing pulse applied thereto at timing periods PT2–7.

The print control circuit PC1 is adapted to be operated by timing pulses PT8–17, the latter of which function to effect a desired shifting of a set condition along the register formed by the print control stages PC1–PC120. In addition, at the end of a predetermined time, a timing pulse PT18 is applied to a further gate 30 to reset the PC circuits.

Figure 3:
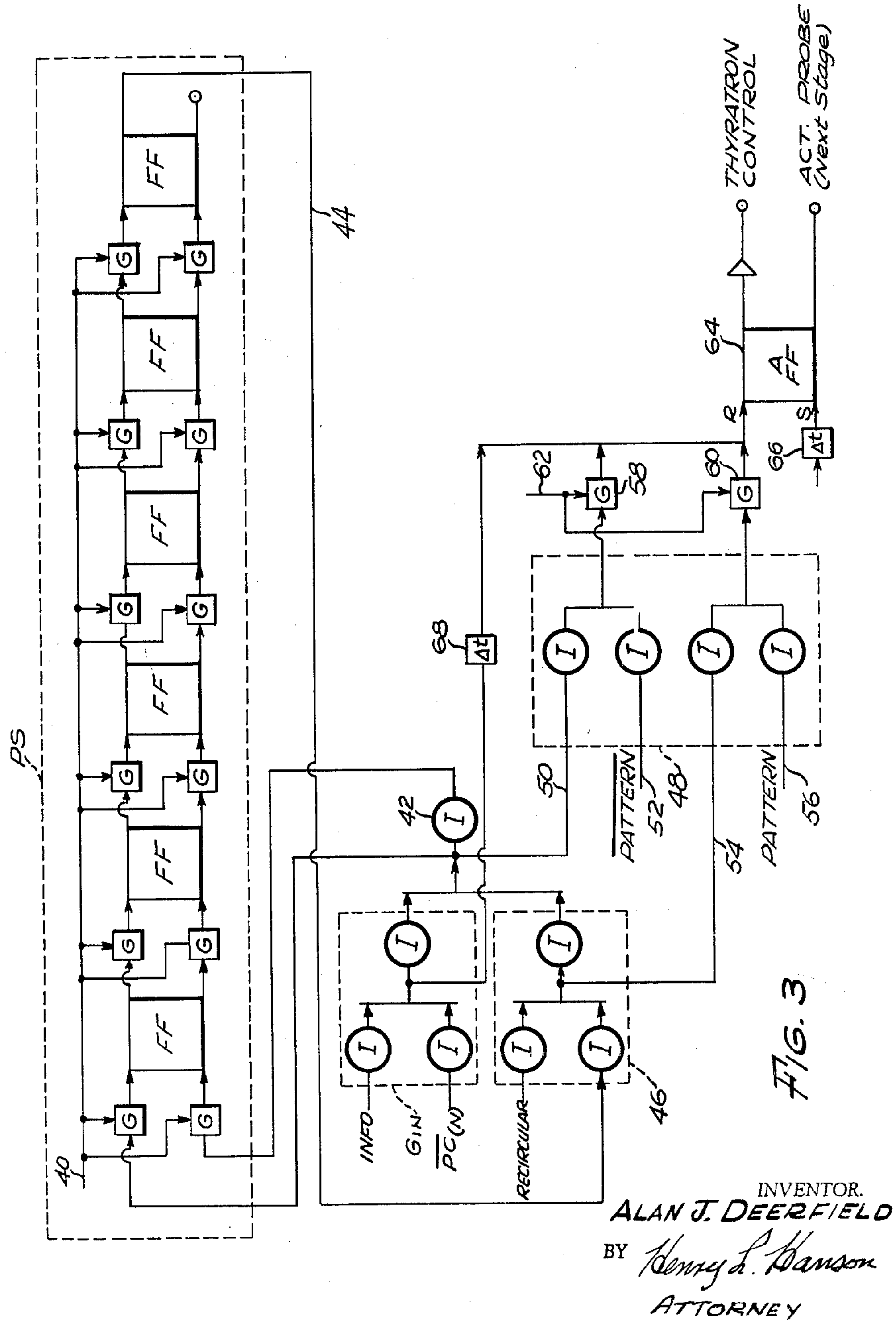
FIGURE 3 is a diagrammatic representation of the print storage circuitry and the associated signal comparison circuits and output circuits controlled thereby.

The outputs of the print control circuit PC1 are passed through a pair of inverters I. The effect of the inverter is to change a low or set state signal on an output terminal into a relatively high signal. Similarly, a high signal on the input of an inverter becomes a low signal on the output thereof. These two signals are amplified by suitable amplifiers A and are available at the output terminals of each of the amplifiers. These two terminals 32 and 34 are the terminals leading to the input circuitry for the print storage circuit, such as illustrated in FIGURE 3.

The print control circuit PC2 is substantially identical to the print control circuit PC1 as are all the other print control circuits from PC3 through PC120.

Considering the operation of the circuitry of FIGURE 2, during a particular conversion operation, a plugboard signal is adapted to come into a selected one of the print control circuits PC1–PC120 as the signal PB. This is effective to set the associated print control circuit.

The gate 28, and corresponding gates associated with the other print control circuits, are also adapted to be clocked by a conversion time pulse derived from a suitable timing source, not shown. These conversion timing signals CT provide the signal necessary for propagating the set state of one print control circuit PC to the next. The timing pulse CT in actual fact occurs at the end of the time that a particular character has been decoded and dropped into print storage, as shown in FIGURE 1. After a particular print storage section has been loaded with a character, the print control circuit PC will step to the next location where the associated gating circuit will be opened so that the next character may be dropped into the next position in print storage. This operation will continue until such time as the horizontal format board indicates that an end of field condition has been reached. Here, the print control stages PC will all be reset. At this point, if further characters are coming in from the input blockette of information, they will be dropped into the next field which again is a field selected by the operator in accordance with a plugged program on the horizontal format board.

FIGURE 3 shows in greater detail the manner in which the print storage PS registers are arranged in combination with circuitry for loading the print storage registers as well as recirculating the information. In addition, FIGURE 3 illustrates the circuitry for making a comparison with a pattern synchronized with the operation of the print wheel and the information in the print storage register.

Information from the character register of FIGURE 1 is applied to the information input line on the input gate $G_{in}$. In addition, a signal from the print control circuit PC, FIGURE 2, is also applied to the input gate $G_{in}$. As long as the information is coming in through the input gate with a particular print control circuit active, the associated information will be read into the register PS. The print storage register PS is a six bit register formed by a series of flip-flops interconnected by gating circuits. The gating circuits interconnecting each of the storage flip-flops of the register periodically receive a gating input from a shift line 40 each time it is desired to shift a character being entered into the register along one position. When information is being entered into the print storage register, the shifting pulses on the line 40 will be timed to coincide with the information pulses coming in on the information line of the input gate $G_{in}$.

It will be noted that there is an inverter stage 42 connected to the output of the input gate $G_{in}$. The need for this inverter circuit 42 is merely to provide assertive and negative signals to the print storage register PS on its input terminals, the flip-flops thereof being of the type requiring assertive and negative inputs at the same time for switching.

When information in the print storage register PS is to be recirculated, the information is shifted out onto the output line 44 and is applied to the input of a recirculation gate 46, the latter being of a construction similar to that of the input gate $G_{in}$. Information applied to the recirculation gate 46 will pass therethrough when an appropriate recirculation signal is applied to the other input gate leg thereof.

The circuitry of FIGURE 3 in addition includes a comparison circuit 48. The comparison circuit 48 has a first pair of inputs 50 and 52 which are adapted to receive a negation form of the information from the print storage circuit PS and the negation of the pattern representative of the next character on the print drum 18 of FIGURE 1. The comparison circuit 48 has an additional pair of inputs at 54 and 56. The input 54 compares the assertive form of the information from print storage PS with the assertive form of the code pattern received from the pattern generator 14 of FIGURE 1.

A pair of gating circuits 58 and 60 are connected to the output of the comparison circuit 48 and provide a means for gating the operation of the comparison circuit on its output by way of a suitable gating line 62, the latter being adapted to be operated at a time when a comparison is being made so that appropriate signals may be applied to the output activity flip-flop 64.

The activity flip-flop 64, this flip-flop corresponding to the flip-flops A in FIGURE 1, is normally set at the start of any particular character printing cycle. If there is a lack of agreement between the character which is in print storage and the character code which is received from the pattern generator 14, an output signal will be applied through the gates 58 and 60 and the activity flip-flop 64 will be reset. Conversely, if the character in print storage PS corresponds to the character produced by the pattern generator 14, there will be no output through the gates 58 and 60 and consequently the activity flip-flop 64 will remain set.

Any activity flip-flop which is in a set state provides a gating signal which will permit the associated thyratron to fire when an appropriate trigger pulse is applied thereto. If the activity flip-flop associated with the thyratron is reset, this thyratron will be gated off and can not be fired when the trigger pulse from the trigger source 20, FIGURE 1, is applied thereto.

Connected to the input of the activity flip-flop 64, and on the inputs of all the other activity flip-flops corresponding to the flip-flop 64 is a pulse differentiating circuit 66. This differentiating circuit is adapted to convert any step change applied to the input thereof into an electrical pulse which is adapted to switch the associated activity flip-flop to the set state.

In the event that the activity flip-flop 64 should remain in a set condition due to the fact that there was a comparison between the character from print storage and the generated pattern, it is desired to reset the flip-flop after the printing has taken place. This is accomplished by a feedback pulse from the output of the thyratron in the form of a thyratron return pulse THRP which is applied to the gate 24 of FIGURE 2. The signal from the thyratron is coupled back into the print control circuit PC where it appears in the output on terminal 34 on FIGURE 2 for application to the related input gating stage, such as the gate $G_{in}$ in FIGURE 3. At the time that this return pulse is applied, the information line on the gate will be low so that the signal from the print control circuit will pass through the gate and out through a differentiating circuit 68 where it will be applied to the reset side of the activity flip-flop 64. This will reset the activity flip-flop so that this flip-flop, as well as all of the others that may have been set in any particular character print cycle will be in the reset state.

Figure 4:
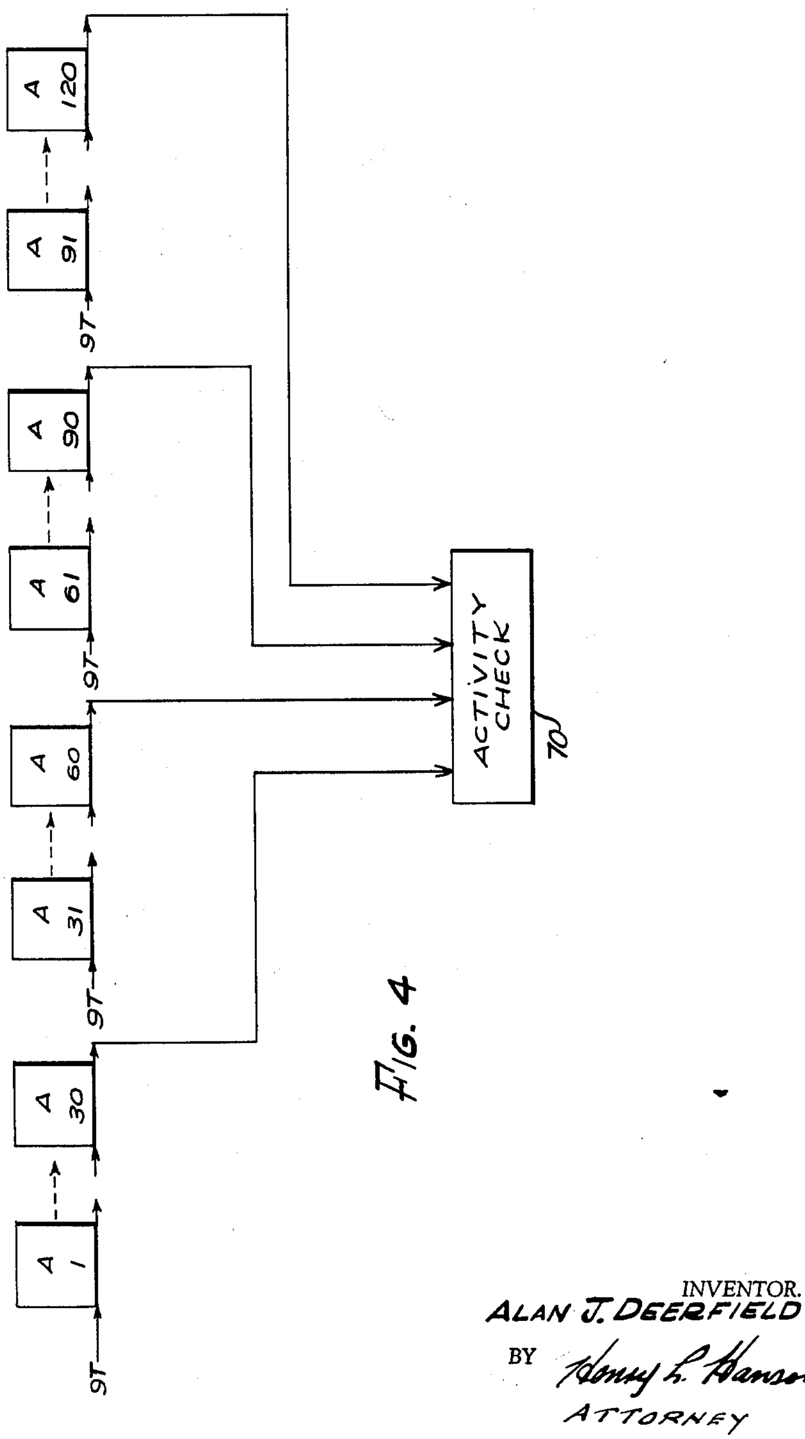
FIGURE 4 is a diagrammatic circuit representation in which the bistable elements of the signal transfer circuit are examined in series for checking purposes.

FIGURE 4 illustrates the way in which the activity flip-flops associated with the output thyratrons are related for checking purposes. In this figure the activity flip-flops A1–A120 are represented. The 120 flip-flops are actually interrelated in four groups of thirty each, although they may be operated as a single group. Thus, the activity flip-flops A1–A30 are operating as a unit; A31–A60 are operating as a second unit; A61–A90 are operating as a third unit; and A91–A120 are operating as a fourth unit. At the time that a check is to be made, a timing pulse designated 9T is applied to the set side of the flip-flops A1, A31, A61, and A91. This signal is propagated along through the respective flip-flops until each of the flip-flops on the outputs, namely A30, A60, A90, and A120 are each in the set state. With all of the activity flip-flops having been switched from the reset to the set state, proper operation of these activity flip-flops has been indicated and the proper setting of the flip-flops A30, A60, A90, and A120 is checked in the activity check circuit 70. If any activity flip-flop in any one of the selections should have already been in a set state, or if a flip-flop in a reset state did not switch to a set state, the signal which was applied to the input of that section could not be propagated down to the end of the section and an error would be indicated by way of the activity check circuit 70, the latter being shown in greater detail in FIGURE 5.

Figure 5:
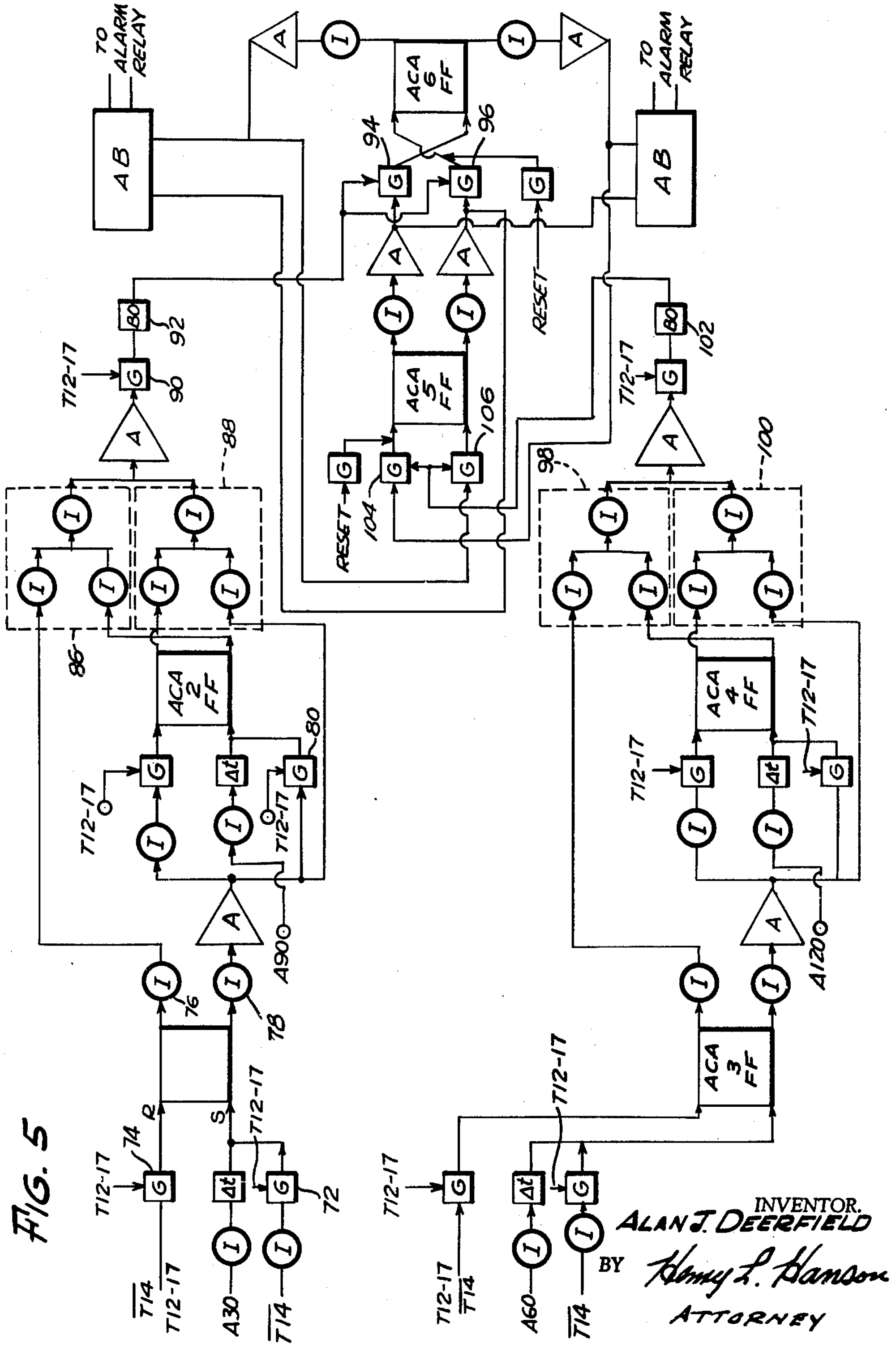
FIGURE 5 is a diagrammatic circuit illustrating the activity check circuit of the present invention.

Referring next to FIGURE 5, there is here shown the activity alarm check circuits adapted to be used to implement the activity check circuit shown in the block form in FIGURE 4. In this check circuitry there are four flip-flops carrying the designation ACA1, ACA2, ACA3, ACA4, ACA5, and ACA6. Normally, the flip-flops ACA1 and ACA3 operate as a pair and in step. Further, the flip-flops ACA2 and ACA4 operate as a pair and in step. Finally, the flip-flops ACA5 and ACA6 likewise operate as a pair and in step.

Referring specifically to the flip-flop ACA1, there are a pair of inputs which are adapted to set the flip-flop, one input being derived from the activity flip-flop 30 of FIGURE 4. The input is passed through an inverter and differentiator and is adapted to set the flip-flop ACA1. In addition, a timing pulse $\overline{T14}$ is applied by way of an inverter and a gate circuit 72 to the input of the flip-flop ACA1. This latter gate circuit also receives timing pulses at times T12–T17. Connected to the reset input side of the flip-flop ACA1 is a gate 74 which is adapted to have timing pulses applied thereto for a resetting of the flip-flop ACA1 at selected time. Connected to the outputs of the flip-flop ACA1 are a pair of inverters 76 and 78.

The flip-flop ACA2 has a pair of inputs for setting the flip-flop ACA2 when there is a signal derived from the activity flip-flop A90 of FIGURE 4 or from a signal received from the set output of the flip-flop ACA1, the latter being applied by way of a gate 80 to the set side of the flip-flop ACA2. A reset input is provided on the input of the flip-flop ACA2 and this is derived from the set side of the flip-flop ACA1 and inverter 78 by way of a further inverter 82 and a gate 84.

Connected to the outputs of the flip-flops ACA1 and ACA2 are a pair of NOR circuits 86 and 88. The outputs of the two NOR circuits 86 and 88 are buffered into an amplifier and then into a gate 90, the latter having timing pulses applied thereto at selected times in the checking cycle of the system. The output of the gate 90 is connected to the blocking oscillator 92 which in turn supplies pulses to a pair of gating circuits 94 and 96 on the input of the flip-flop ACA6.

The circuitry associated with the flip-flops ACA3 and ACA4 is basically the same as that associated with the flip-flops ACA1 and ACA2. The outputs from these two flip-flops are coupled by way of a further pair of NOR circuits 98 and 100 and a gated blocking oscillator 102 to a further pair of gates 104 and 106 on the input of the flip-flop ACA5. Connected to the output of the flip-flop ACA5 are a pair of inverters and amplifiers which supply inputs to the gates 94 and 96 on the input of the flip-flop ACA6. Similarly, the output of the flip-flop ACA6 is coupled by way of a pair of inverters and amplifiers to the gating circuits 104 and 106 on the input of the flip-flop ACA5. Connected to the outputs of both of the flip-flops ACA5 and ACA6 are a pair of alarm bridge circuits AB which may be of the type shown in FIGURE 6.

Figure 6:
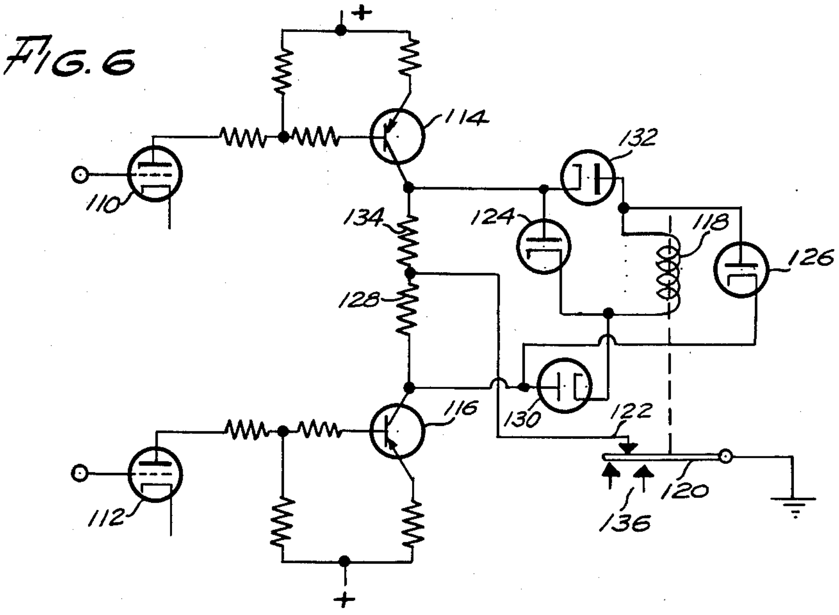
FIGURE 6 is a schematic representation of an alarm bridge which may be associated with the circuits of FIGURE 5.

Referring now to FIGURE 6, the alarm bridge circuit AB will be seen to comprise a pair of input amplifier tubes 110 and 112 which are connected in current controlling relationship to a pair of transistor devices 114 and 116, respectively. Under conditions of normal operation, one or the other of the transistors 114 and 116 will be conducting. As long as one or the other of the two transistors is conducting, current will be flowing through an output alarm relay coil 118 so that the coil will remain energized and an associated switch blade 120 will be held in an energized position against a contact 122. If the transistor 114 is conducting, the current will flow through the transistor 114 from a positive voltage source, a diode 124, coil 118, a diode 126, resistor 128, and switch contact 122 to the switch blade 120, the latter being connected to ground.

In the event that the transistor 116 is switched into the conducting state, a current flow path may be traced from the positive terminal through the transistor 116, a diode 130, coil 118, a diode 132, resistor 128, switch contact 122, and switch blade 120 to ground.

It will be apparent that if neither of the transistors 114 and 116 are conducting, or if both of the transistors are conducting at the same time, there will be no current flow through the coil 118 and the relay will become de-energized to engage a pair of alarm contacts 136.

Referring back to FIGURE 5, it is to be noted that this activity check circuit when combined with the alarm bridge circuit as illustrated in FIGURE 6 will serve to determine whether or not all of the activity flip-flops A1–A120 of FIGURE 4 are in the set state at a particular instant in the checking operation. If they are not in the desired set state, the circuitry of FIGURE 5 will so indicate and the alarm bridge relays will be de-energized to indicate a circuit failure.

Figure 7:
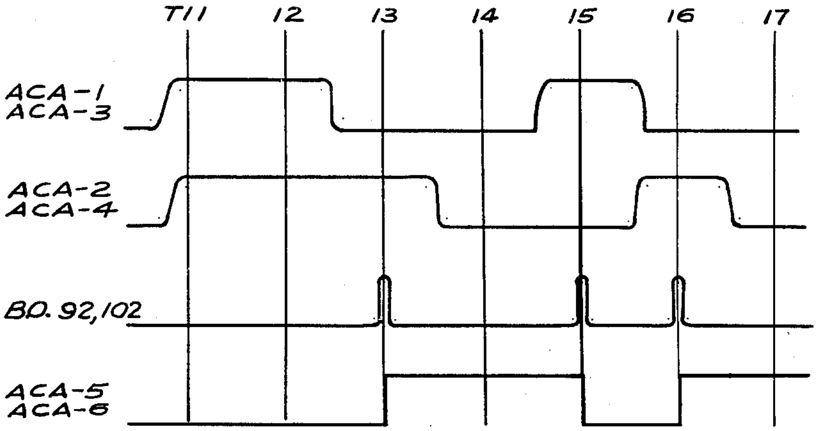
FIGURE 7 illustrates representative timing charts which may be associated with the respective circuits.

The operation of this output activity check circuitry of FIGURES 4 and 5 may be understood by reference to the timing chart of FIGURE 7. In the normal operation of the checking circuits, the timing pulse 9T is applied to the the activity flip-flops of FIGURE 4. Thus, at sometime prior to time T11, as shown in FIGURE 7, the flip-flops ACA1–ACA4 will have been switched into the set state. If one of the flip-flops does not switch into the set state, the alarm bridge relays will be de-energized indicating a failure. For example, if the activity flip-flop A60 was not switched into the set state by the application of the timing pulse 9T which ripples through the flip-flops A31–A60 under normal operation, the flip-flop ACA3 will not be set. With the flip-flop ACA3 reset and the flip-flop ACA4 set at time T12, a signal will be passed through the NOR circuit 98 and will appear on the output of the blocking oscillator 102. This pulse will appear at time T12 and will switch the flip-flop AC5 from its one stable state to the opposite stable state. However, there will not be a pulse received from the blocking oscillator 92, the flip-flop AC6 will remain in its fixed state and thus a balanced condition will be present on the lines feeding the alarm bridge amplifiers 110 and 112 of FIGURES 6 and the alarm relay coil 118 will be de-energized.

Normally, all of the flip-flops ACA1–ACA4 are set at time T11, as illustrated in FIGURE 7, and there will be no outputs from either of the blocking oscillators 92 or 102. It is desired that the operation of these flip-flops should also be checked and consequently a timing pulse is produced at time T12 and serves as a reset pulse on the flip-flops ACA1 and ACA3. Thus between time T12 and T13 the flip-flops ACA1 and ACA3 will be reset. This change in state of the two flip-flops ACA1 and ACA3 without a corresponding change in the flip-flops ACA2 and ACA4 will create an unbalanced condition in the NOR circuits and a pulse will appear at time T13 on the blocking oscillators 92 and 102. Since these pulses on the two blocking oscillators occur at the same time, the flip-flops ACA5 and ACA6 will both be switched at the same time and the signals to the alarm bridges AB, while reversed. However, there still will be a current flowing through the relay coil 118 as the transistors will have merely acted to reverse their operation.

Due to the switching of the flip-flops ACA1 and ACA3 to the reset state, the signals will then be coupled into the flip-flops ACA2 and ACA4. These flip-flops will then be reset between time T13 and T14. As long as the flip-flops ACA2 and ACA4 do switch to the reset state, there will be no error indicated. At time T14, there is a set pulse applied to the flip-flops ACA1 and ACA3. This causes the flip-flops ACA1 and ACA3 to be set at time T15 and a pulse to appear on the outputs of the blocking oscillators 92 and 102. This in turn causes the flip-flops ACA5 and ACA6 to be reversed in state. If both of the later flip-flops do switch, then the alarm bridge will not indicate any failure.

Once again, the switching of the flip-flops ACA1 and ACA3 causes the flip-flops ACA2 and ACA4 to follow so that at time T16, the flip-flops ACA2 and ACA4 are set. Since the flip-flops ACA1 and ACA3 switch back to the reset state, there will be present the signal conditions on the NOR circuits to produce a timing pulse at time T15 on the outputs of the blocking osciialtors 92 and 102. Once again, this will cause the flip-flops ACA5 and ACA6 to switch state and thereby reverse the signals to the alarm bridge circuits of FIGURE 6.

At time T17, if the flip-flop circuits ACA1–ACA6 are working properly, the alarm bridge will not have indicated any circuit failure. Further, the flip-flops ACA1–ACA4 should all be reset.

It will be apaprent that if at any time the pairs of flip-flops get out of step a condition will be created to de-energize the relay coil 118 and indicate a failure. The flip-flops can get out of step if there is an internal failure or a failure in the activity circuits as to be discussed in detail below. In other words, a flip-flop circuit failure, or a failure in the coupling circuits therefor will create an error condition and the alarm on the output will be actuated.

Next to be considered is the over-all operation of the activity checking system whereby it is possible to determine if the activity flip-flops are operating properly and also to check to see if the thyratrons which should have been energized were actually energized. Referring back to FIGURE 1, the operation of the system is divided into two major time periods, the first being the time period when characters are read from the character register 11 into the print storage positions PS1–PS120. At the end of the print storage loading period, the information in print storage is ready for readout to the print mechanism. As pointed out above, the drum 18 has a plurality of characters spaced about the periphery thereof in a predetermined sequence. Consequently, the characters in print storage are read out of print storage in the sequence in which the characters apepar on the surface of the drum 18. Thus, for each character on the print wheel, the characters in the print storage registers will be compared with the reference code produced by the pattern generator.

Prior to making any one character comparison, all of the activity flip-flops A are in the set state. As pointed out above, if there is no comparison between the code for the pattern generator and the character stored in any print storage location, the activity flip-flop associated therewith will be reset. Conversely, if there is a comparison, the activity flip-flop will remain in the set state. When any one activity flip-flop is set, the associated thyratron may be fired as soon as the trigger pulse from the trigger source 20 is received. When the thyratron does fire, a feedback pulse from the thyratron output is applied back by way of the print control circuit PC of FIGURE 2 to reset the activity flip-flop of FIGURE 3 which had remained set due to the fact that a particular character has been selected.

At the end of each character print cycle, all of the activity flip-flops A1 through A120 should be in the reset state. Thus, as shown in FIGURE 4, when a timing pulse 9T is applied at selected points along the flip-flops, this timing pulse is in effect rippled through the flip-flops to switch them from the reset state to the set state. As long as all of the flip-flops A1 through A120 switch from the reset state back to the set state, the activity check circuit will not indicate an alarm in the manner described above with respect to FIGURE 5. At the end of this check operation, the circuit is then ready for a further character print cycle. Thus, each time that a character comes up, a complete check is made of all of the activity circuits as well as the operation of the thyratrons which are controlled thereby to determine not only the proper operation of the activity circuits but the thyratrons circuits as well. This check also extends to the print control PC circuits which function in a closed loop with the thyratrons to provide a check which is carried out by way of the activity circuits. In other words, the check made in the activity circuits, at each stage, is actually an operational check that includes a plurality of other units which must be operative in order for the check to be carried out.

It will thus be seen that there has been provided a new and improved apparatus for checking the operation of a signal transmission circuit to insure that an alarm condition be indicated in the event of a circuit failure or the failure of a signal to be properly transmitted therethrough.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and which it is desired to secure by Letters Patent is:

1. Checking apparatus for a plurality of signal transfer circuits, each of which is adapted to function as an independent transfer circuit coupling data to a plurality of output means, a bistable circuit element included in each of said transfer circuits, means connected to each bistable circuit element to switch said circuit element to one of its bistable states when a signal is to be transferred thereby, means connected to the output of each of said transfer circuits to feed back a signal which has been transferred thereby to switch the associated bistable circuit element to the other bistable state if said circuit had been in said one bistable state, and monitor means connected to all of said bistable circuit elements to produce an error indication if all of said bistable circuits are not in the same state at the end of a signal transfer.

2. Checking apparatus for a plurality of signal transfer circuits, each of which is adapted to function as an independent transfer circuit coupling data to a plurality of output means, a bistable circuit element included in each of said transfer circuits, means connected to each bistable circuit element to switch said circuit element to one of its bistable states when a signal is to be transferred thereby, means connected to the output of each of said transfer circuits to feed back a signal which has been transferred thereby to switch the associated bistable circuit element to the other bistable state if said circuit had been in said one bistable state, means connected to all of said bistable circuits to produce an error indication if all of said bistable circuits are not in the same state, said last named means comprising means to initiate the switching of all of said bistable circuits from said other bistable state to said one bistable state, and a monitor for sensing the absence of all of said bistable circuits being in the same state.

3. Checking apparatus for a plurality of signal transfer circuits, each of which is adapted to function as an independent transfer circuit, a bistable circuit element included in each of said transfer circuits, means connected to each bistable circuit element to switch said circuit to one of its bistable states when a signal is to be transferred thereby, means connected to the output of each of said transfer circuits to feed back a signal which has been transferred thereby to switch the associated bistable circuit to the other bistable circuit element to switch said circuit to one of its state, and means connected to all of said bistable circuit elements to produce an error indication if all of said bistable circuit elements are not in the same state, said last named means comprising means to effect the sequential switching of said bistable circuit elements from said other bistable state to said one bistable state.

4. A checking circuit for a plurality of digital signal transfer circuits each of which is adapted to operate independently of the others comprising a bistable circuit element connected in each of said circuits, means conditioning selected ones of said bistable circuit elements in one bistable state when a signal is to be transferred through the associated transfer circuits, means connected to the outputs of said transfer circuits when a signal has been transferred thereby to change the state of said selected bistable circuit elements by feeding back the transferred signal, and a timed error sensing means connected to all of said bistable circuits to produce an error signal if all of said bistable circuits are not in the same stable state.

5. A checking circuit for a plurality of digital signal transfer circuits each of which is adapted to operate independently of the others comprising a bistable circuit element connected in each of said circuits, means conditioning selected ones of said bistable circuit elements in one bistable state when a signal is to be transferred through the associated transfer circuits, means connected to the outputs of said transfer circuits when a signal has been transferred thereby to change the state of said selected bistable circuit elements by feeding back the transferred signal, signal switching means connected to said bistable circuit elements to change the state of all of said bistable circuit elements, and a timed error sensing means connected to all of said bistable circuit elements to produce an error signal if all of said bistable circuit elements are not in the same stable state.

6. A checking circuit for a plurality of digital signal transfer circuits each of which is adapted to operate independently of the others comprising a bistable circuit element connected in each of said transfer circuits, means conditioning selected ones of said bistable circuit elements in one bistable state when a signal is to be transferred through the associated transfer circuits, means connected to the outputs of said transfer circuits when a signal has been transferred thereby to change the state of said selected bistable circuit elements by feeding back the transferred signal, means connecting each of said bistable circuit elements in a series circuit so that a signal may be transferred therethrough to switch all of said bistable circuit elements to the same stable state, and a timed error sensing means connected to all of said bistable circuit elements to produce an error signal if all of said bistable circuit elements are not in the same stable state.

7. In combination, a plurality of pulse transfer circuits each adapted to operate independently of the others, a bistable circuit element in series with each of said transfer circuits, first means connected to each of said elements to switch said elements to a first bistable state, second means connected to said elements to change the bistable state of selected ones of said elements, feedback means connected from the output of each of said transfer circuits to the associated bistable circuit element to change the state of said element by way of the transferred signal if not changed by said second means, and means coupled to said circuit elements to check the identity of state of all of said elements after said feedback means has operated.

8. In combination, a plurality of pulse transfer circuits each adapted to operate independently of the others, a bistable circuit element in series with each of said transfer circuits, first means connected to each of said elements to switch said elements to a first bistable state, second means connected to said elements to change the bistable state of selected ones of said elements, feedback means connected from the output of each of said transfer circuits to the associated bistable circuit element to change the state of said element by way of the transferred signal if not changed by said second means, third means connected to said elements to switch all of said elements to said first bistable state, and means coupled to said circuit elements to check the identity of state of all of said elements.

9. In combination, a plurality of pulse transfer circuits each adapted to operate independently of the others, a bistable circuit element in series with each of said transfer circuits, first means connected to each of said elements to switch said elements to a set state, second means connected to said elements to reset selected ones of said elements, feedback means connected from the output of each of said transfer circuits to the associated bistable circuit element to reset said element by way of the transferred signal if not reset by said second means, third means connected to said elements to initiate a sequential switching of said elements to the set state, and means coupled to said circuit elements to check the identity of state of all of said elements.

10. In combination, a plurality of pulse transfer circuits each adapted to operate independently of the others, a bistable circuit element in series with each of said transfer circuits, first means connected to each of said elements to switch said elements to a first bistable state, second means connected to said elements to change the bistable state of selected ones of said elements, feedback means comprising a further bistable circuit element connected from the output of each of said transfer circuits to the associated bistable circuit element to change the state of said element by way of the transferred signal if not changed by said second means, and means coupled to said circuit elements to check the identity of state of all of said elements.

11. A checking circuit for use with a digital data processor comprising a plurality of separate series operative data circuits, means connecting each of said data circuits in a closed series loop and each of said data circuits including a checking circuit element, and means connecting the checking elements of all of said data circuits in series to propagate a signal directly therethrough from one checking circuit element to the next so that a single check may be made of all of the data circuits and the checking elements.

12. A checking circuit for use with a digital data processor comprising a plurality of separate series operative data circuits, means connecting each of said data circuits in a closed series loop, each of said data circuits including a bistable checking element, and means connecting the bistable checking elements of all of said data circuits in series to propagate a signal directly therethrough from one checking element to the next by sequentially switching the bistable state of said elements so that a single check may be made of all of the data circuits and said checking elements.

13. A data processor circuit comprising a plurality of separate data manipulating circuits, each of said circuits comprising a plurality of circuit elements connected in a closed series circuit, a checking circuit element included in each of said series circuits, circuit means connecting each of said checking circuits in a checking series circuit, means connected to said checking series circuit to initiate a signal propagation directly through each checking circuit element in said checking series circuit, and operational indicating means connected to said checking series circuit.

14. A data processor circuit comprising a plurality of separate data manipulating circuits, each of said circuits comprising a plurality of circuit elements connected in a closed series circuit, a bistable checking circuit element included in each of said series circuits, circuit means connecting each of said bistable checking circuits in a checking series circuit, means connected to said checking series circuit to initiate a signal propagation directly through each checking circuit element in said checking series circuit by sequentially switching said bistable checking circuits, and operational indicating means connected to said checking series circuit.

15. A data processor circuit comprising a plurality of separate data manipulating circuits, each of said circuits comprising a plurality of circuit elements connected in a closed series circuit, a checking circuit element included in each of said series circuits, circuit means connecting each of said checking circuits in a checking series circuit, means connected to said checking series circuit to initiate a signal propagation directly through each of said checking circuit elements in said checking series circuit, and operational indicating means connected to said checking series circuit, said operational indicating means comprising a pair of signal receiving circuits adapted to be switched from one electrical state to another by signals propagated through said checking series circuit, and means producing an error signal when the outputs of said signal receiving circuits are not matched.

References Cited in the file of this patent

UNITED STATES PATENTS

| | | |
|---|---|---|
| 2,597,428 | Bachelet | May 20, 1952 |
| 2,696,599 | Holbrook | Dec. 7, 1954 |
| 2,702,380 | Brustman | Feb. 15, 1955 |
| 2,769,971 | Bashe | Nov. 6, 1956 |
| 2,813,149 | Cory | Nov. 12, 1957 |
| 2,884,625 | Kippenhan | Apr. 28, 1959 |
| 2,911,622 | Ayres | Nov. 3, 1959 |